R. B. MATTHEWS.
MACHINE FOR FACING GRINDSTONES.

No. 77,303.   Patented Apr. 28, 1868.

Witnesses.
Edmund H. Keeney
J. W. Baldwin

Inventor.
R. S. Matthews
by his Attorney
Frederick Curtis.

United States Patent Office.

REUBEN B. MATTHEWS, OF FITCHBURG, MASSACHUSETTS.

*Letters Patent No. 77,303, dated April 28, 1868.*

IMPROVED MACHINE FOR FACING GRINDSTONES.

*The Schedule referred to in these Letters Patent and making part of the same.*

TO ALL TO WHOM THESE PRESENTS SHALL COME:

Be it known that I, REUBEN B. MATTHEWS, of Fitchburg, in the county of Worcester, and State of Massachusetts, have invented a new and useful Machine for Performing the Operation of Facing Grindstones; and do hereby declare the following to be a full, clear, and exact description thereof, due reference being had to the accompanying drawings, making part of this specification, and in which—

Figure 2:
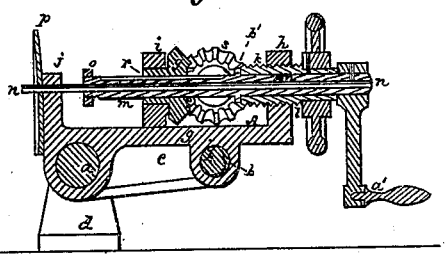

Figure 1 is a plan,

Figure 2 a vertical central and transverse section, and

Figure 1:
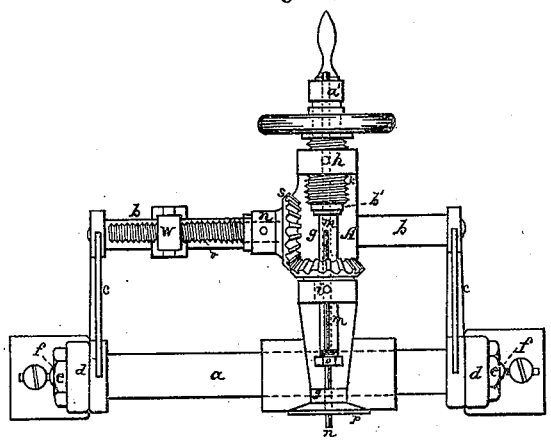
Figure 3:
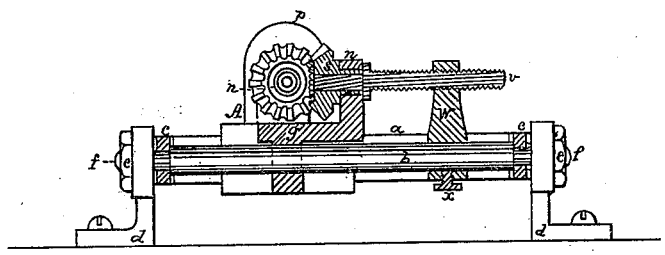

Figure 3 a vertical central and longitudinal section of a machine constructed in accordance with my invention.

The object sought, in making this invention, is to perform the operation or labor of grinding or cutting the periphery of a grindstone to a true circle, or an even face, such operation being technically called "facing" the stone, and now generally accomplished by an iron bar, held in the hands of a workman, and pressed against the periphery of the revolving stone, the bar being placed against the adjacent portion of the frame supporting the stone, which serves as a bearing or fulcrum for such bar, in order to enable it to be pressed in contact with the stone with considerable power.

The invention consists in a sliding carriage, moving upon horizontal ways or guides, suitably supported, and carrying a bar of iron at right angles to its path of movement, the necessary alternating movements or feeding of the carriage being effected by bevelled gears and a screw, so applied and combined therewith that upon the turning of a crank, the cutting-tool or bar shall be caused to traverse the periphery of the stone from right to left, and *vice versa*, until the circumference of the stone is reduced to a circle, the cutting-bar being advanced sufficiently fast to compensate for its wear, by a sliding tubular shaft, applied to the sliding carriage before mentioned, and carrying one of the screw-operating gears, the whole being arranged and operating substantially as hereinafter described.

Reference being had to the accompanying drawings, above referred to as making part of this specification, it will be seen that A denotes a carriage, in form resembling that of the ordinary lathe "head-stock," this carriage being supported and sliding upon two horizontal parallel shafts, $a$ $b$, the latter being hinged to the former by vibrating-arms, $c$ $c$, in such manner as to allow of its being raised or lowered with respect thereto, for the purpose of effecting the horizontal adjustment of the stone-reducing tool, the journals $ff$ of the shaft $a$ being supported and turning at each end in suitable standards, $d$ $d$, and having a nut, $e$, screwed upon their outer extremities, which, upon being screwed tightly up against the standards $d$ $d$, serve to maintain the shaft $a$ and carriage A firmly in place.

When it becomes desirable to change the angle of the carriage, (which the varying sizes of stones may require,) the nuts $e$ $e$ are to be loosened, and the necessary adjustment of such carriage effected, the nuts being subsequently tightened. The sliding carriage is composed of a suitable base, $g$, and uprights, $h$ $i$ $j$.

A tubular male screw, $k$, is inserted, and so as to revolve within a female screw, $l$, cut through the outer upright, $h$, of the carriage A, the bore of the screw $k$ receiving and serving as a bearing to one end of a hollow revolving shaft, $m$, which extends through it, the outer extremity of such shaft $m$, as it projects beyond the screw $k$, being provided with a crank, $a'$, or other suitable device for rotating it; the outer end of the screw $k$ also being provided with a hand-wheel, or its equivalent, by means of which such screw is put in rotation, for the purpose of advancing or retracting the hollow shaft, and the reducing-tool or bar, which it carries, the opposite ends of the said screw being confined between the said crank and a collar or rib, $b'$, fixed to or making part of the shaft $m$, as shown in fig. 2 of the drawings.

This reducing-tool is shown at $n$, as a bar of iron, of a cylindrical or other proper shape, inserted within the bore of the shaft $m$, and securely held in place thereon by a suitable chuck, $o$, applied to the inner end of such shaft, and between the uprights $i$ $j$ of the frame A.

The inner extremity of the tool $n$ projects a short distance beyond the upright, $j$, the inner face of which is provided with a shield, $p$, for protecting the workman, as well as the working parts of the machine, from the dust and dirt resulting from the reduction of the circumference of the stone.

A bevelled gear, $q$, is applied to the hollow shaft $m$, and with its shank or journal, $r$, revolving in a bearing made in the upright, $i$, of the carriage A, the attachment of the gear to the shaft being the ordinary groove and spline, which admits of longitudinal movements of the shaft through the gear, but at the same time causing the two to revolve together.

The said bevelled gear $q$ engages with a second bevelled gear, $s$, the shank of which revolves in a fourth upright or standard, $n$, making part of the carriage A, and secured to the inner end of a long screw, $v$, which is screwed through the upper part of a post, $w$, upheld by the shaft $b$, before mentioned, the post $w$ being secured to the shaft by a set-screw, $x$; the object in making the post adjustable, or movable with respect to the shaft $b$, being to enable the relative position of the carriage A, and its mechanism, to be moved or adjusted very quickly, should occasion require, as it will be obvious that upon loosening the set-screw $x$, the said carriage and mechanism may be moved laterally upon the shafts $a$ $b$, without the time occupied by the comparatively slow movement effected by the revolution of the screw $v$.

The above description of the mechanical construction of my invention, taken in connection with the accompanying drawings, will enable mechanics to manufacture it.

In putting such an invention into practical use, the standards $d$ $d$ are to be securely bolted or otherwise secured to the frame of the grindstone, and with the inner end of the reducing-tool $n$ in immediate proximity or in contact with the grinding-face or periphery of the revolving stone.

By revolving the crank $a'$ from right to left, or *vice versa*, as occasion requires, the carriage A, by means of the gears $q$ and $s$ and screw $v$, will be moved laterally upon the shafts $a$ and $b$, and consequently the tool $n$ will be caused to make alternate transverse movements across the grinding-face of the stone, and by this means reduce its circumference to a circle, the tool being advanced at proper times, and to a sufficient extent, by means of the tubular screw $k$, as to compensate for its wear.

The operation of facing a grindstone by the modes ordinarily adopted, is well known to be an arduous and disagreeable one, requiring the expenditure of much manual strength to accomplish it.

By means of my invention the work is performed, not only with the exertion of very little strength on the part of the workman, but in a comparatively very short space of time, this economy of time, in a large manufactory, being of great importance.

The rotation of the cutting-end of the tool $n$, effected by the revolution of the shaft $m$, causes a sharp cutting-edge to be always presented to the face of the stone.

Having thus described my invention and its mode of operation, what I claim, or believe as novel and original with myself, and desire to secure by Letters Patent of the United States, is as follows:

1. I claim applying the carriage A, and its above-described mechanism, to the shaft $a$, in such manner as to be enabled to effect its horizontal adjustment, or angle of departure from a horizontal line, substantially as before described.

2. I claim the combination and arrangement, with the carriage A, of the tubular screw $k$, hollow shaft $m$, and bevelled gear $q$, the whole being arranged and operating as before set forth and explained.

3. I claim, in combination with the carriage A, screw $k$, shaft $m$, bevelled gear $q$, and shaft $b$, the screw $v$, as supported upon the adjustable post $w$, and provided with the bevelled gear $s$, in manner and operating as before set forth.

REUBEN B. MATTHEWS.

Witnesses:
   CHAS. E. FAY,
   A. C. PLAISTED.